US011989825B1

(12) United States Patent
Slomka (10) Patent No.: US 11,989,825 B1
(45) Date of Patent: *May 21, 2024

(54) SYSTEMS AND METHODS FOR REMOVING LIGHTING EFFECTS FROM THREE-DIMENSIONAL MODELS

(71) Applicant: Illuscio, Inc., Culver City, CA (US)

(72) Inventor: Joseph Slomka, Sherman Oaks, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,501

(22) Filed: Oct. 31, 2023

Related U.S. Application Data

(63) Continuation of application No. 18/312,638, filed on May 5, 2023, now Pat. No. 11,830,130.

(51) Int. Cl.
*G06T 15/50* (2011.01)
*G01N 21/25* (2006.01)
*G01N 21/31* (2006.01)
*G06T 17/00* (2006.01)

(52) U.S. Cl.
CPC ........... *G06T 15/506* (2013.01); *G01N 21/31* (2013.01); *G06T 17/00* (2013.01); *G06T 2215/16* (2013.01)

(58) Field of Classification Search
None
See application file for complete search history.

(56) References Cited

U.S. PATENT DOCUMENTS

| | | | |
|---|---|---|---|
| 11,830,130 B1* | 11/2023 | Slomka | G06T 17/00 |
| 2013/0266221 A1 | 10/2013 | Kaneko | |
| 2014/0028801 A1 | 1/2014 | Tin | |
| 2019/0239752 A1 | 8/2019 | Dumitrescu et al. | |
| 2020/0116627 A1 | 4/2020 | Kessler et al. | |
| 2022/0003671 A1 | 1/2022 | Ghosh et al. | |
| 2022/0351414 A1* | 11/2022 | Kosecoff | A61Q 1/02 |
| 2023/0108409 A1* | 4/2023 | Deliwala | A61B 5/0075 382/128 |

* cited by examiner

*Primary Examiner* — Tize Ma
(74) *Attorney, Agent, or Firm* — Ansari Katiraei LLP; Arman Katiraei; Sadiq Ansari (57) ABSTRACT

Disclosed is a system and associated methods that account for the change in coloring or tint that some wavelengths of light have on materials of an object, and that generate an object model with the accounted for change in coloring or tint removed from the pixels or constructs of that model. The system receives spectral data in different electromagnetic spectrum bands for a particular surface of the object. The system measures a first quality of the light that illuminates the object, and determines a reactivity of the particular surface to the first quality of the light based on the spectral data matching a spectral signature of a material having that reactivity. The system removes the light effects on the particular surface by adjusting the spectral data according to the reactivity to the first quality of the light and measuring the first quality in the light illuminating the object.

20 Claims, 6 Drawing Sheets

SYSTEMS AND METHODS FOR REMOVING LIGHTING EFFECTS FROM THREE-DIMENSIONAL MODELS

CLAIM OF BENEFIT TO RELATED APPLICATIONS

This application is a continuation of U.S. nonprovisional application Ser. No. 18/312,638 with the title "Systems and Methods for Removing Lighting Effects from Three-Dimensional Models", filed May 5, 2023. The contents of application Ser. No. 18/312,638 are hereby incorporated by reference.

BACKGROUND

Three-dimensional ("3D") models may be generated from scanning or imaging physical objects. Different lighting conditions change or affect the physical object appearance, and therefore change or affect the 3D models that are generated when the same objects are scanned or imaged under different lighting conditions. For instance, light may not reach all parts of a physical object equally. Consequently, the 3D model of that physical object may have regions that have inconsistent brightness, contrast, coloring, and/or other visual discrepancies. Similarly, a first object may be scanned under bright lighting conditions, and a second object may be scanned under dark lighting conditions. When the 3D models of the first object and the second object are inserted in the same 3D environment, the 3D models will have an inconsistent or unrealistic appearance because of the different lighting conditions used to capture and create each 3D model.

In many instances, an artist manually adjusts the brightness, color, and/or other visual aspects of one or more of the 3D models so that they have a consistent or coherent appearance when placed together in the same scene or environment. Even then, the 3D models may have visual inconsistencies when viewed from new angles, or the visual inconsistencies may reappear when the 3D models are relit with artificial lights.

DETAILED DESCRIPTION OF PREFERRED EMBODIMENTS

The following detailed description refers to the accompanying drawings. The same reference numbers in different drawings may identify the same or similar elements.

Provided are systems and methods for removing lighting effects from three-dimensional ("3D") objects, and for generating 3D models that accurately represent those 3D objects independent of the light that was illuminating the 3D objects at the time the positional and non-positional data for the 3D models was captured from the 3D objects. The systems and methods specifically account for the change in coloring or tint that some wavelengths of light have on specific materials of an object, and generate the 3D model of that object to remove the accounted for change in coloring or tint. In this manner, the systems and methods generate the same or consistent looking 3D models when a particular physical object is scanned or imaged under different lights or lighting conditions, and/or when the scan or image data that is affected by the different lights or lighting conditions is used to generate the 3D model of the particular physical object.

In some embodiments, a 3D modeling system accounts for and removes the effects that different wavelengths of light have on different surfaces of a modeled object by determining the properties of the materials that form those surfaces. The 3D modeling system determines the material properties based on the spectral data that is reflected off and/or measured from those surfaces. The 3D modeling system also measures the qualities of the light that illuminates the surfaces and/or the object. The 3D modeling system determines the reactivity of the material properties to the determined qualities of the light, and removes the effects that the determined qualities of the light have on the points, polygons, meshes, or other 3D constructs of the 3D model representing the surfaces of the modeled object based on the reactivity of the surface material properties to the determined qualities of the light.

The 3D modeling system automatically removes the lighting effects when a 3D model is generated or when the 3D model is inserted in a scene with other 3D models. With the lighting effects removed, different 3D models of different 3D objects may be combined in the same scene and may have a coherent and consistent visualization. In other words, the 3D models are each normalized to a presentation that is unaffected by light. Moreover, the 3D modeling system generates the normalized 3D models without any manual adjustments to the 3D models and without adjusting one 3D model to match the brightness, contrast, color balance, and/or other visual characteristics of another 3D model.

In some embodiments, the 3D modeling system performs feature differentiation based on the removal of the lighting effects. For instance, different features may have a similar appearance or color characteristics when illuminated with a particular light. Specifically, a first feature of an object may have a first color, and a second feature of the object may have a different second color. However, the second feature may reflect certain wavelengths of light, and when the second feature is illuminated with those certain wavelengths of light, the visualization of the second feature changes to the first color. Those same wavelengths of light may have no effect on the visualization of the first feature. For instance, the first feature may have a yellow tint and the second feature may be white. A light with a yellowish tint may illuminate both features causing the second feature to have the same coloring or tint as the first feature. By removing the lighting effects, 3D modeling system 100 differentiates the pixels, points, meshes, polygons, or other constructs that form the first feature from those that form the second feature. 3D modeling system 100 may automatically select the constructs forming the first feature to assist in the selection and editing of the first feature without selecting or changing the constructs forming the second feature.

Figure 1:
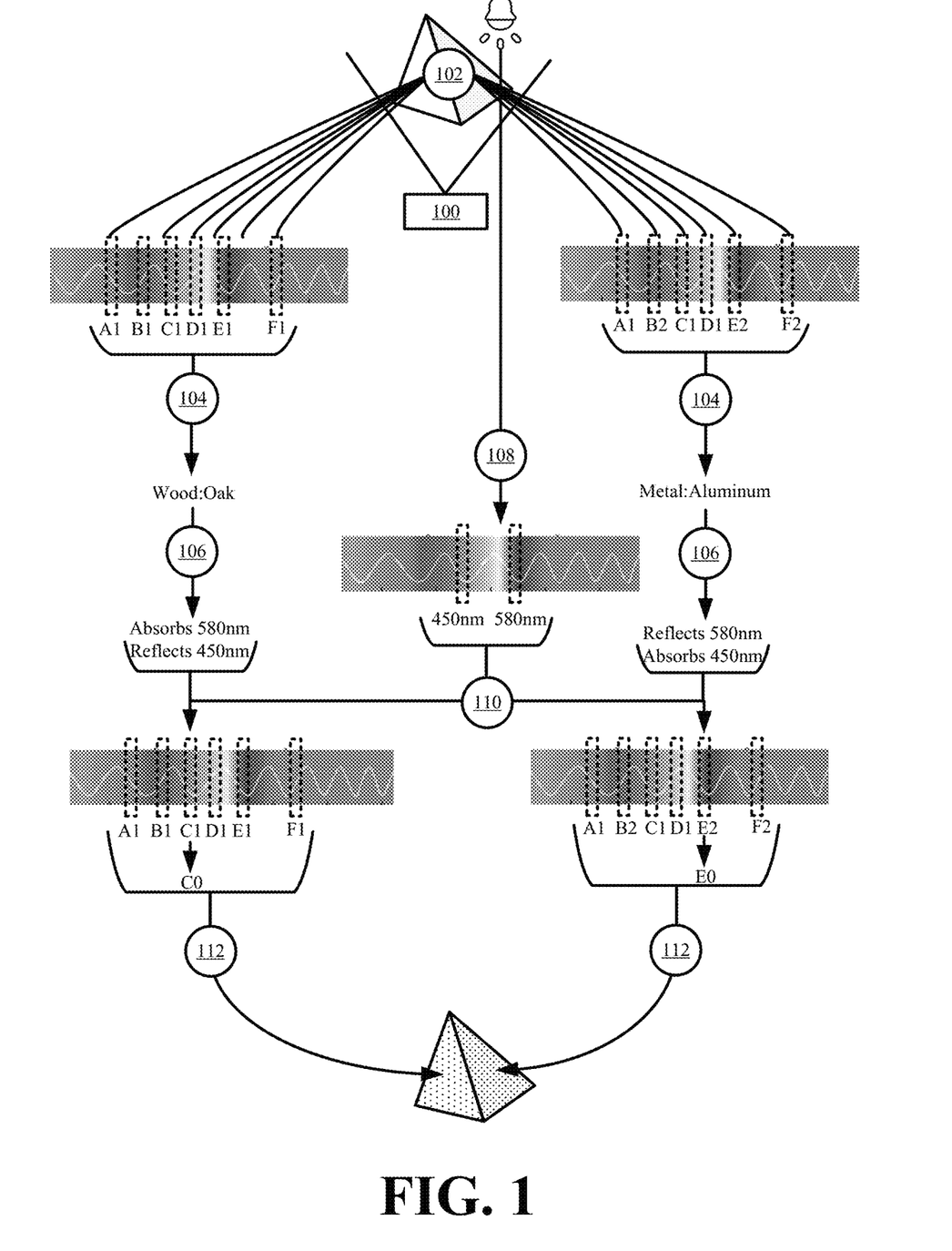
FIG. 1 illustrates an example of automatically removing light effects from a three-dimensional ("3D") capture of an object in accordance with some embodiments presented herein.

FIG. 1 illustrates an example of automatically removing light effects from a 3D capture of an object in accordance with some embodiments presented herein. 3D modeling system 100 performs (at 102) a multi-spectral or multi-channel capture of the object. Performing (at 102) the multi-spectral or multi-channel capture includes measuring the intensity with which different points or surfaces of the object reflect multiple bands of the electromagnetic spectrum in addition to or instead of the red, green, and blue ("RGB") visible light bands. Each band may include a different set of wavelengths from the electromagnetic spectrum. For instance, 3D modeling system 100 may capture an image in which the image pixels are defined with values measured across the RGB visible light bands and wavelengths in one or more other visible light bands (e.g., magenta, yellow, orange, etc.), infrared light bands, ultraviolet light bands, and/or other bands of the electromagnetic spectrum. Specifically, the RGB visible light bands may include wavelengths between 620-700 nanometers ("nm") for red light, wavelengths between 495-570 nm for green light, and wavelengths between 450-495 nm blue light. In addition to these wavelengths, 3D modeling system 100 may measure intensity values in between 590-620 nm for orange light, 380-450 nm for violet light, and in between 700-1000 nm for infrared light.

3D modeling system 100 maps (at 104) the spectral data to the spectral signatures of one or more material properties. Each material property reflects the different bands of the electromagnetic spectrum with different intensities. The different intensities in the different bands are unique to each material property and collectively define the spectral signature of the material property. For instance, metal and plastic have different spectral signatures, and different types of metals (e.g., aluminum and steel) have different spectral signatures that uniquely identify that type of metal. The spectral signature of each material or material property is defined over two or more bands of the electromagnetic spectrum with the difference in just one electromagnetic band being sufficient to differentiate one material from another. For instance, aluminum and steel may have the same reflective characteristics for three or more bands of the electromagnetic spectrum and a measurable difference in the intensity with which at least one particular band is reflected. The spectral signatures therefore correspond to the different sets of intensity values in a specific set of bands of the electromagnetic spectrum that uniquely identify each of the material properties.

3D modeling system 100 determines (at 106) the effect that different wavelengths of light have on the identified material properties of the object. In particular, 3D modeling system 100 determines (at 106) how each of the identified material properties reacts to the different wavelengths of light, wherein the reactivity may be quantified in terms of the amount of each wavelength that is absorbed or reflected by that material property, and/or may be quantified in terms of how coloring, tinting, or brightness of the material property is affected by each wavelength.

In some embodiments, 3D modeling system 100 includes a database that stores the spectral signatures of each material property and the amount by which each material property is affected by or reacts to different qualities of light. For instance, the database identifies different amounts with which different material properties reflect or absorb different wavelengths of light or light with different colors or temperatures. In some embodiments, 3D modeling system 100 uses one or more artificial intelligence and/or machine learning techniques ("AI/ML") to model and/or measure the reactivity of different material properties to different wavelengths of light.

3D modeling system 100 measures (at 108) the qualities of the light or lights illuminating the object at the time of performing (at 102) the multi-spectral or multi-channel capture of the object. Measuring (at 108) the qualities of the illuminating light may include determining the wavelengths that are emitted from the one or more light sources illuminating the object.

3D modeling system 100 adjusts (at 110) the captured spectral data based on the reactivity of the identified material properties to the measured qualities of the light. For instance, a particular pixel from the multi-spectral capture may be used to define the color values for a particular 3D construct of the 3D model. The spectral data associated with that particular pixel may map to a material property that reflects a first wavelength of light and absorbs a second wavelength of light. 3D modeling system 100 determines that the light used to illuminate the object includes the first and second wavelengths, and removes the lighting effects by adjusting the spectral data of the particular pixel to remove the measurements associated with the first wavelength of light.

3D modeling system 100 defines (at 112) the 3D model using the adjusted spectral data. Specifically, 3D modeling system 100 defines the color values for the 3D constructs of the 3D model based on the adjusted spectral data of the pixels that represent the same points or surfaces of the object as the 3D constructs.

Figure 2:
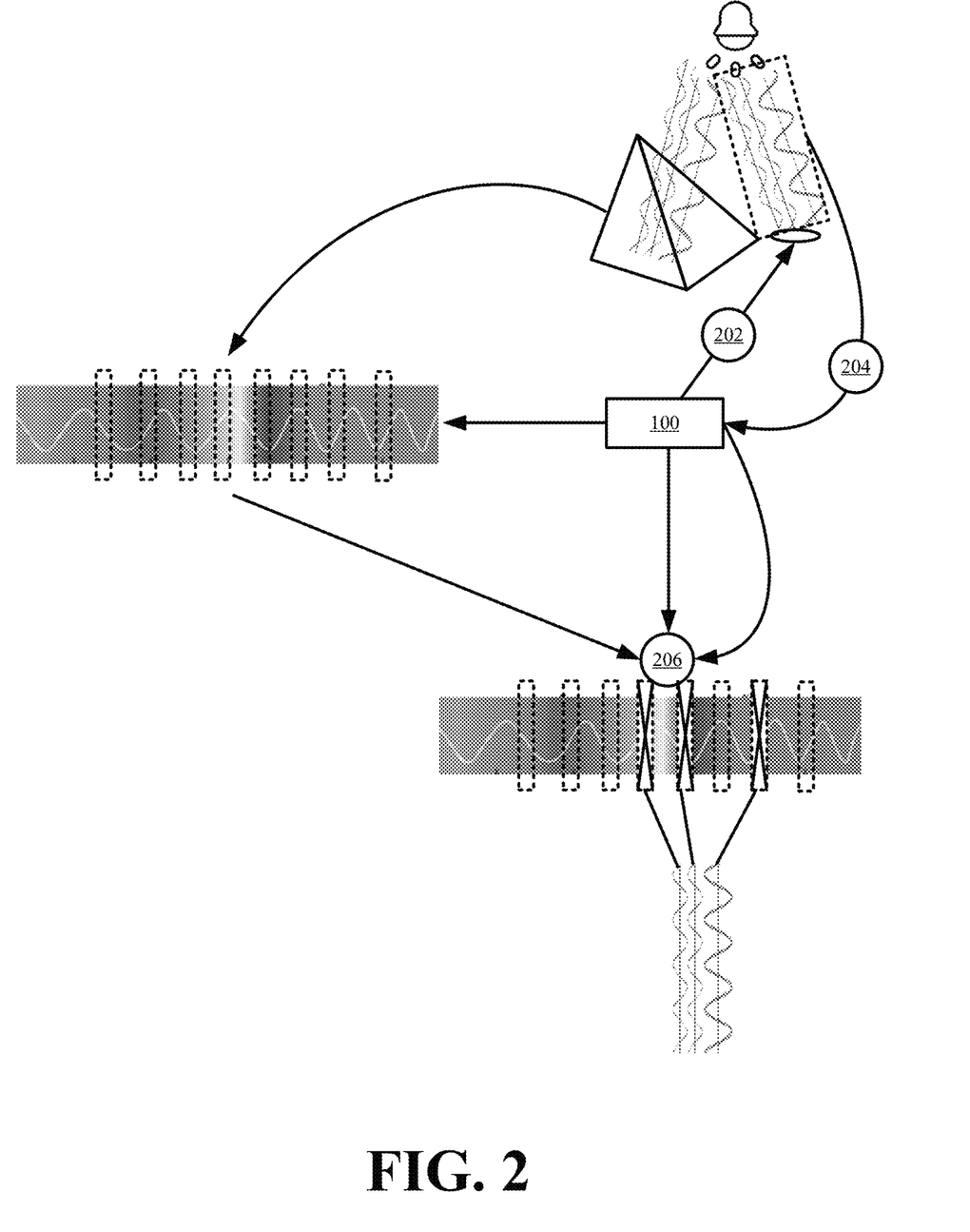
FIG. 2 illustrates an example of measuring the qualities of one or more lights that illuminate an object in accordance with some embodiments presented herein.

FIG. 2 illustrates an example of measuring the qualities of one or more lights that illuminate an object in accordance with some embodiments presented herein. 3D modeling system 100 identifies (at 202) a reference point in the scene with the object. The reference point may be part of the scene, and may include a white background or wall with known or measured color characteristics. The reference point may also be added to the scene. For instance, the reference point may be a pure white object with known characteristics from which to determine the qualities of the light illuminating the scene. In some embodiments, 3D modeling system 100 is configured to use the reference point for measuring the qualities of the light.

3D modeling system 100 measures (at 204) a change that occurs to the reference point when it is illuminated with the one or more lights. Measuring (at 204) the change may include performing another multi-spectral or multi-channel capture of the reference point in order to determine the qualities of the light illuminating the scene. Specifically, measuring (at 204) the change to the reference point includes identifying the different wavelengths of the light. In some embodiments, the reference point is a pure white reflective objective, and 3D modeling system 100 has a hyperspectral sensor that detects each wavelength that reflects off the reference point with those reflected wavelengths being emitted from one or more light sources that illuminate the scene.

3D modeling system 100 removes (at 206) the identified wavelengths of the light from the spectral data that is captured for an object in the same scene and that is illuminated by the same light, or from the color values assigned to a 3D model that is generated for the object. In some embodiments, the 3D model is defined as data points that are distributed in a 3D space of a point cloud. The data points are defined at positions corresponding to positions of scanned points, surfaces, or features of the object, and thereby collectively recreate the shape and form of the object. The color values for the data points are defined from the spectral data that is obtained for the object and that is mapped from the pixels of the spectral capture (e.g., a 2D image) to the data points representing the same points, surfaces, or features as the pixels. In some embodiments, the 3D model is defined as connected meshes, polygons, or other 3D constructs that recreate the shape and form of the object, and the color values for the 3D constructs are assigned or defined based on the captured spectral data.

3D modeling system 100 may use other techniques to measure and/or determine the spectral qualities or wavelengths of the light illuminating the scene. In some embodiments, 3D modeling system 100 is equipped with a specialized light meter that detects the wavelengths of the light illuminating an object. In some other embodiments, 3D modeling system 100 has a database that stores the qualities associated with different light sources.

Figure 3:
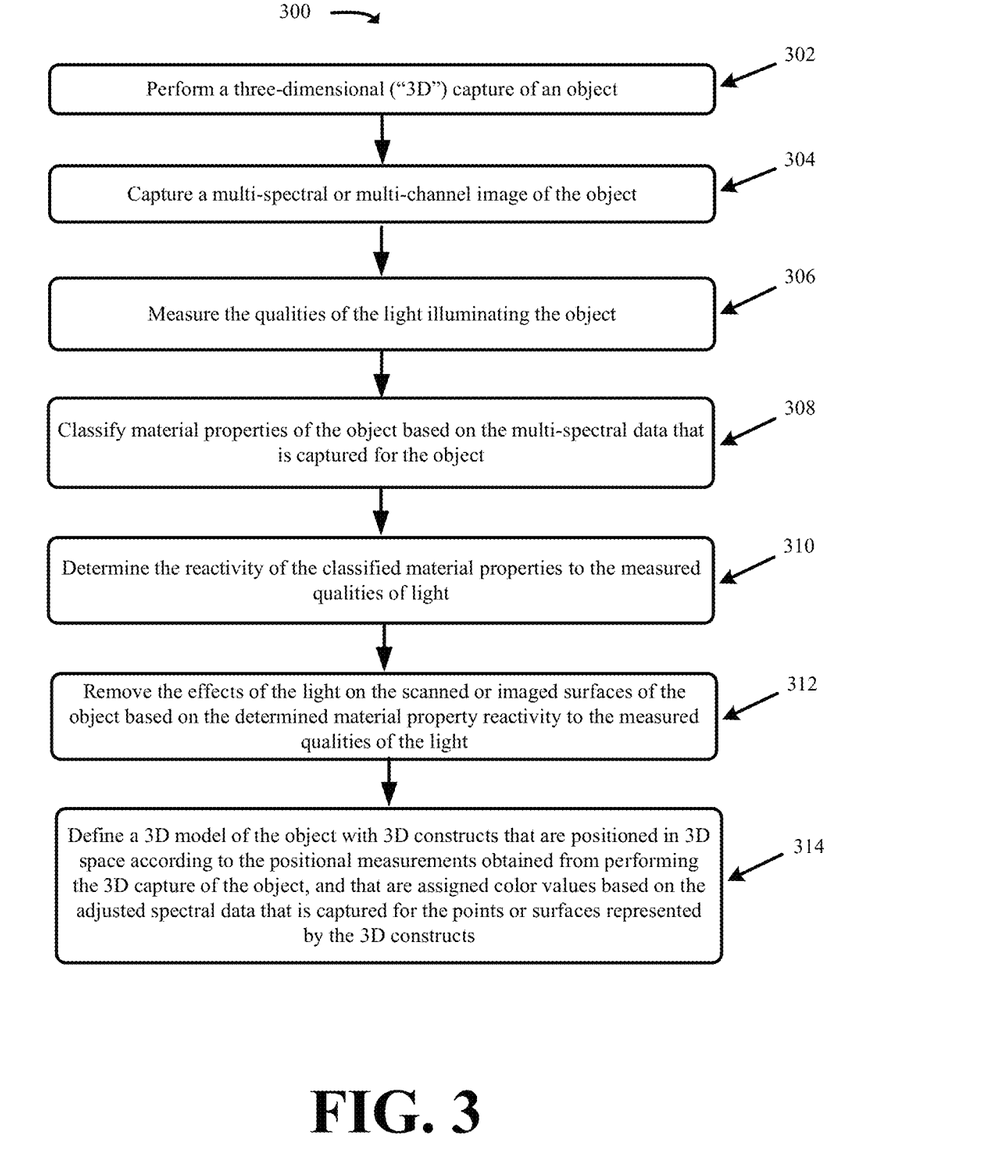
FIG. 3 presents a process for generating a 3D model of an object independent of the effects of the light illuminating the object in accordance with some embodiments presented herein.

FIG. 3 presents a process 300 for generating a 3D model of an object independent of the effects of the light illuminating the object in accordance with some embodiments presented herein. Process 300 is implemented by 3D modeling system 100. 3D modeling system 100 includes one or more devices or machines with processor, memory, storage, network, and/or other hardware resources used for the 3D capture of objects with different 3D scanning or imaging equipment, for the generation of 3D models, and/or for the editing of the 3D captures or 3D models to remove the light effects from the 3D captures or 3D models.

Process 300 includes performing (at 302) a 3D capture of an object. Performing (at 302) the 3D capture may include activating one or more of a 3D or depth-sensing camera, a structured light or patterned light imaging device, Light Detection and Ranging ("LiDAR") sensor, Magnetic Resonance Imaging ("MRI") device, Positron Emission Tomography ("PET") scanning device, Computerized Tomography ("CT") scanning device, time-of-flight device, and/or other imaging equipment for 3D objects, volumetric objects, or 3D environments. The imaging equipment scans the surfaces of the object, and determines the 3D positions (e.g., x, y, and z coordinate positions) for different scanned points about the surfaces of the object. In some embodiments, the 3D capture of the object involves taking two-dimensional ("2D") images of the object from different sides or angles, and using a photogrammetry technique to determine the 3D positioning of the object and to define the form and shape for the 3D model of the object.

Process 300 includes capturing (at 304) a multi-spectral or multi-channel image of the object. Capturing (at 304) the multi-spectral or multi-channel image may be performed as part of or independent of performing (at 302) the 3D capture of the object. Capturing (at 304) the multi-spectral or multi-channel image includes activating a hyperspectral sensor to measure different intensities with which different points about the surface reflect multiple bands of the electromagnetic spectrum other than or in addition to the RGB bands. Accordingly, each pixel of the multi-spectral or multi-channel image may represent the spectral data for a different point of the object, and the spectral data may include values for the reflectivity in the RGB visible light bands, other visible light bands, and non-visible light bands such as the infrared bands, ultraviolet bands, and/or other bands of the electromagnetic spectrum.

Process 300 includes measuring (at 306) the qualities of the light illuminating the object. The object may be illuminated naturally with sunlight or artificially with different light sources at different positions. In any case, measuring (at 306) the qualities of the light includes determining the wavelengths of the light. The wavelengths may have different impacts on the coloring of the object. For instance, light with a yellowish hue may impart a yellowish tint on certain parts or materials of the object, and blue light may impart a bluish tint on certain parts or materials of the object. Similarly, different wavelengths of light may react differently to different materials of the object. Some materials may reflect more of a certain wavelength than other materials, and may therefore have a difference in brightness.

3D modeling system 100 may measure (at 306) the qualities of the light using the same hyperspectral sensor that was used for capturing (at 304) the multi-spectral or multi-channel image of the image. 3D modeling system 100 may direct the hyperspectral sensor towards a reference point with known color characteristics, and may measure the changes to the color characteristics of the reference point. Alternatively, 3D modeling system 100 may direct the hyperspectral sensor directly to the light source, and may measure the light that is emitted from that light source. The reference point may include a white surface that reflects all wavelengths of visible light and/or a set of wavelengths that are measured or detected by the hyperspectral sensor. In some embodiments, 3D modeling system 100 measures (at 306) the qualities of the light using a specialized light sensor or light meter. In some such embodiments, the specialized light sensor may detect the different wavelengths associated with the illuminating light and/or specify an intensity associated with each wavelength. In any case, 3D modeling system 100 measures (at 306) the qualities of the light independent of the spectral qualities of the object as the object surfaces may have their own spectral qualities that react differently to the light, thereby preventing an accurate measuring of the light.

Process 300 includes classifying (at 308) material properties of the object based on the multi-spectral data that is captured for the object. Classifying (at 308) the material properties includes identifying groups of pixels that have the same or related spectral data (e.g., values in the different captured bands that are within a threshold range of one another), and matching the spectral data of each group of pixels to the spectral signature that is stored for a different material property. 3D modeling system 100 stores the spectral signatures of the different material properties and/or a mapping of different spectral data or different ranges of values in the different bands to the different material properties.

Process 300 includes determining (at 310) the reactivity of the classified (at 308) material properties to the measured (at 306) qualities of light. In some embodiments, 3D modeling system 100 is configured with the reactivity of different material properties to the different wavelengths of light. For instance, a first material property, such as a particular type of wood, may be defined to be reactive to a first wavelength of light but not a second wavelength of light, and a second material property, such as a particular plastic, may be defined to be reactive to the second wavelength but not the first wavelength.

In some embodiments, 3D modeling system 100 uses AI/ML techniques to model the reactivity of different material properties to different wavelengths. For instance, the AI/ML techniques may determine that certain spectral properties or values for certain bands of the electromagnetic spectrum are reflective or absorptive of certain wavelengths of light, and may therefore extrapolate that material properties having those spectral properties of values will also reflect or absorb those certain wavelengths.

The reactivity is a measure of the effect or impact that different wavelengths have on the material property. In other words, the reactivity may be based on whether the material property reflects or absorbs the different wavelengths, and/or whether the color, tint, hue, brightness, or other visual characteristic of the material property changes when illuminated with the different wavelengths of light. For instance, a material property that reflects a particular wavelength will inherit the color characteristics of that particular wavelength if the light illuminating the object with the material property includes that particular wavelength. More specifically, a first white surface may be reactive to yellow light and a second white surface may not be reactive to yellow light. When the first white surface and the second white surface are illuminated with the same yellow light, the first white surface will visually change to have a yellowish tint to it, whereas the second white surface will retain its original white color or tint and will not visually change because of the yellow light. When constructing a 3D model of an object based on spectral captures of these two surfaces illuminated with the yellow light and without removing the lighting effects on the 3D model, the 3D constructs forming the first white surface in the 3D model will be incorrectly modeled and defined with the yellowish tint because of the material property's reactivity to the yellow light, whereas the 3D constructs forming the second white surface in the 3D model will be correctly modeled and defined with the original white color because of the material property's lack of reactivity to the yellow light.

Process 300 includes removing (at 312) the effects of the light on the scanned or imaged surfaces of the object based on the determined (at 310) material property reactivity to the measured (at 306) qualities of the light. Removing (at 312) the light effects may include normalizing the spectral data of the object based on the measured wavelengths of the illuminating light. For instance, if the pixels in the multispectral image of the object are defined with spectral data that is classified to a particular material property and the particular material property is reactive to a specific wavelength of the illuminating light, then 3D modeling system 100 zeros out, removes, or otherwise adjusts the values associated with the specific wavelength in the spectral data of those pixels. Continuing with the example above, if the first white surface is classified with a material property that reflects the yellow light and is captured with spectral data that has the yellow tint or intensity values for the wavelengths of the yellow light used to illuminate that first white surface, then 3D modeling system 100 removes the yellow tint or the intensity values for the wavelengths of the yellow light. Conversely, if a third yellow surface is classified with a material property does not reflect or absorbs the yellow light and is captured with spectral data that has the yellow tint or the intensity values for the wavelengths of the yellow light, then 3D modeling system 100 retains the spectral data for the third yellow surface because the yellow tint or the intensity value are determined to be associated with the third yellow surface rather than the light illuminating that surface.

In some embodiments, the spectral data is adjusted according to a degree of reactivity. For instance, if the particular material property reflects 50% of a particular wavelength of the illuminating light, then 3D modeling system 100 decreases or adjusts by 50% the values associated with the particular wavelength in the spectral data of the pixels that are classified with the particular material property.

Process 300 includes defining (at 314) a 3D model of the object with 3D constructs that are positioned in 3D space according to the positional measurements obtained from performing (at 302) the 3D capture of the object, and that are assigned color values based on the adjusted spectral data that is captured (at 304) for the points or surfaces represented by the 3D constructs. The adjusted spectral data is the spectral data captured (at 304) for different points of the object after the effects of the illuminating light are removed (at 312) from the spectral data associated with the points that are reactive to certain wavelengths of the illuminating light.

By automatically and accurately removing the light effects, 3D modeling system 100 simplifies the creation of 3D models that are generated from 3D captures of objects under different lighting conditions. 3D modeling system 100 generates 3D models that have a consistent and coherent look for objects that are in different locations, scanned at different times-of-day, or scanned with different lighting conditions without manual adjusting of the 3D models or adjusting visual characteristics of one 3D model to match those of another 3D model. Objects may be scanned wherever and whenever, and the 3D models generated from those scans may be entered in the same scene without visual discontinuity because 3D modeling system 100 detects and corrects for the different effects that different wavelengths of the different illuminating light have on different materials or material properties of the scanned objects.

Moreover, the 3D models may be placed in a new scene and relit according to artificial lights that are defined for the new scene. Ray-tracing and/or other lighting techniques may be used to accurately relight each of the 3D models without compounding or carrying over the lighting effects that illuminated the objects on which the 3D models are based. For instance, an object may be illuminated from a left side, and a 3D model may be generated for that object. If lighting effects are not removed from the 3D model and the 3D model is inserted in a new scene with a light that illuminates the 3D model from the right side, then the 3D model will have an unrealistic and inaccurate appearance as the left and right sides will be equally lit even though the light is only coming from the right side. 3D modeling system 100 automatically corrects the 3D model before it is inserted into the new scene and is relit by removing the effects of the original light on the 3D model. Specifically, the unbalanced illumination of the left side of the model is removed before the 3D model is inserted into the new scene. The 3D model with the removed lighting effects can then be inserted into the new scene, and existing lighting techniques may be used to realistically and accurately illuminate only the right side of the 3D model since the lighting effects applied to the left of the object when generating the 3D model have been removed.

In some embodiments, 3D modeling system 100 performs the automatic removal of the light effects for feature differentiation. Feature differentiation simplifies the selection and editing of distinct features within a 3D model by automatically distinguishing between a first set of 3D constructs that form a first feature of the 3D model from a second set of 3D constructs that form a second feature of the 3D model even though the spectral data that is captured for the first set of 3D constructs or the second set of 3D constructs has color commonality or visual similarity. 3D modeling system 100 makes the distinction by accounting for the different reactivity that the two features have to different wavelengths of light.

Figure 4:
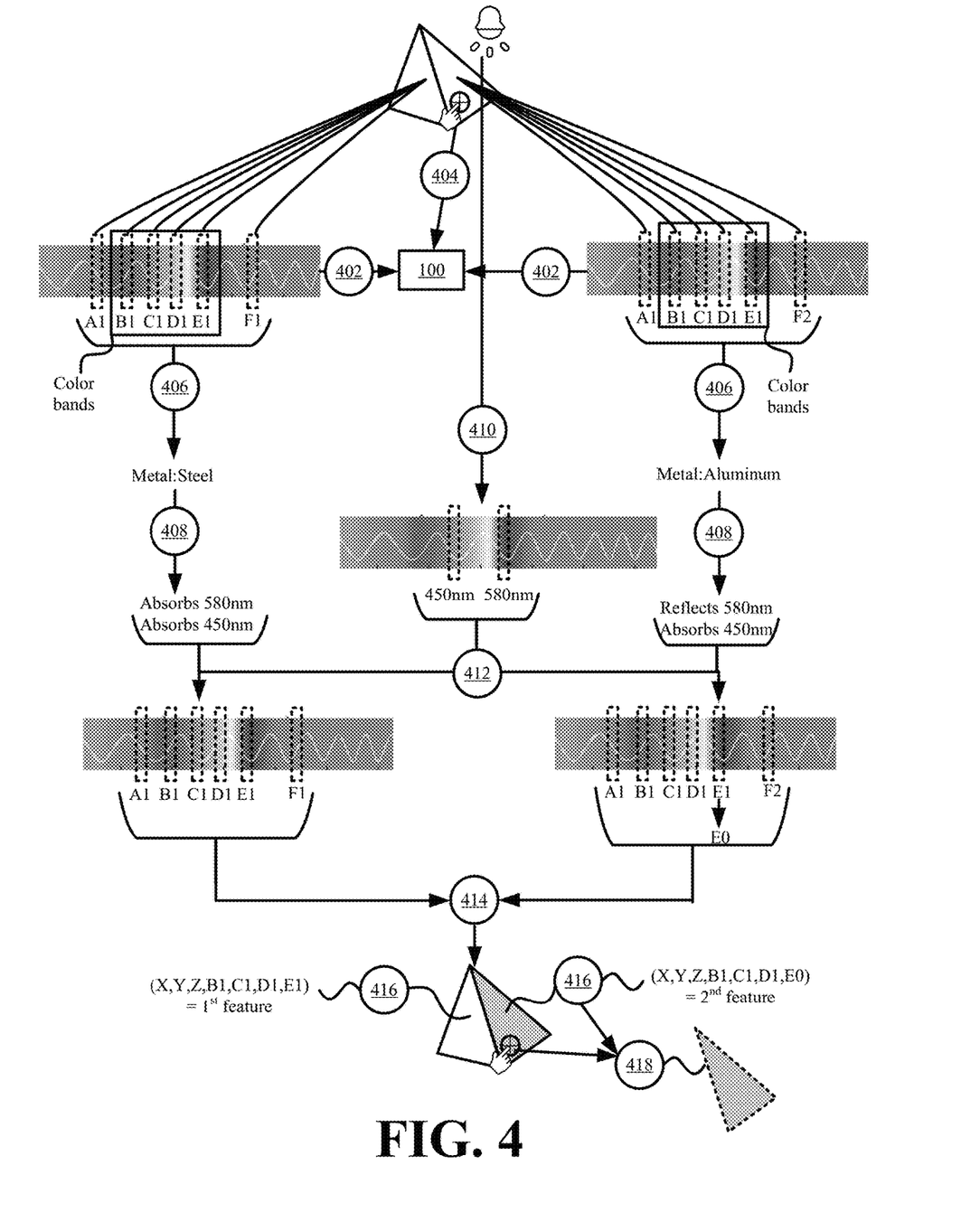
FIG. 4 illustrates an example of performing feature differentiation by accounting for and/or removing the effects of light in accordance with some embodiments presented herein.

FIG. 4 illustrates an example of performing feature differentiation by accounting for and/or removing the effects of light in accordance with some embodiments presented herein. 3D modeling system 100 receives (at 402) or captures spectral data for a particular object. The spectral data associated with the visible light bands or the bands used to the define the color for different surfaces or features of the particular object are the same or similar. In other words, the different surfaces or features have the same or similar coloring, tinting, brightness, and/or other visual characteristics, and cannot be differentiated based on the visual characteristics or the spectral data of the different surfaces or features that is used to define those visual characteristics. However, the spectral data captures differences in other bands that are not used to define the visual characteristics of the surfaces.

3D modeling system 100 also receives (at 404) a user input for selecting or editing a particular part of the 2D image or 3D model containing the spectral data for the object. For instance, a user may activate a particular editing tool over a pixel or 3D construct that represents the particular part of the object.

3D modeling system 100 performs (at 406) the material property classification, determines (at 408) the material property reactivity, and obtains (at 410) the qualities of the light that illuminated the particular object at the time the spectral data was captured. 3D modeling system 100 adjusts (at 412) the spectral data based on the reactivity of the different classified material properties to the different qualities of the light.

3D modeling system 100 compares (at 414) the adjusted spectral data, and differentiates (at 416) different features of the particular object based on the adjusted spectral data. For instance, the particular object may be imaged with a uniform yellow tint across its entire surface. However, by adjusting the spectral data to account for the reactivity of the different material properties to the different qualities of the illuminating light, 3D modeling system 100 detects a first feature of the particular object that retains its yellow tint, and a second feature of the particular object that is a different color or tint and that changes to the yellow tint because the second feature reacts to and reflects one or more wavelengths of the illuminating light. In other words, after adjusting the spectral data by removing the effects of the illuminating light on the color capture of the different material properties of the particular object, 3D modeling system 100 identifies a first set of pixels from the 2D image or a first set of 3D constructs from the 3D model that have a different set of color values or spectral data than a second set of pixels from the 2D image or a second set of 3D constructs from the 3D model.

3D modeling system 100 determines that user input was applied relative a pixel or 3D construct of the differentiated second feature, and automatically selects (at 418) the differentiated second set of pixels or the second set of 3D constructs that form the second feature of the particular object in response to the user input. In some embodiments, 3D modeling system 100 applies an edit associated with the user input to the automatically selected (at 418) pixels or 3D constructs of the second feature. Accordingly, 3D modeling system 100 determines that the color commonality between the first and second features was due to the light reactivity of the second feature, and further determines that the visual qualities of the second feature actually differ from the visual qualifies of the first feature once the effects of the illuminating light are removed from the reactive material properties of the second surface. The differentiated features may then be selected and edited differently without the user having to manually define the outlines of the different features.

Figure 5:
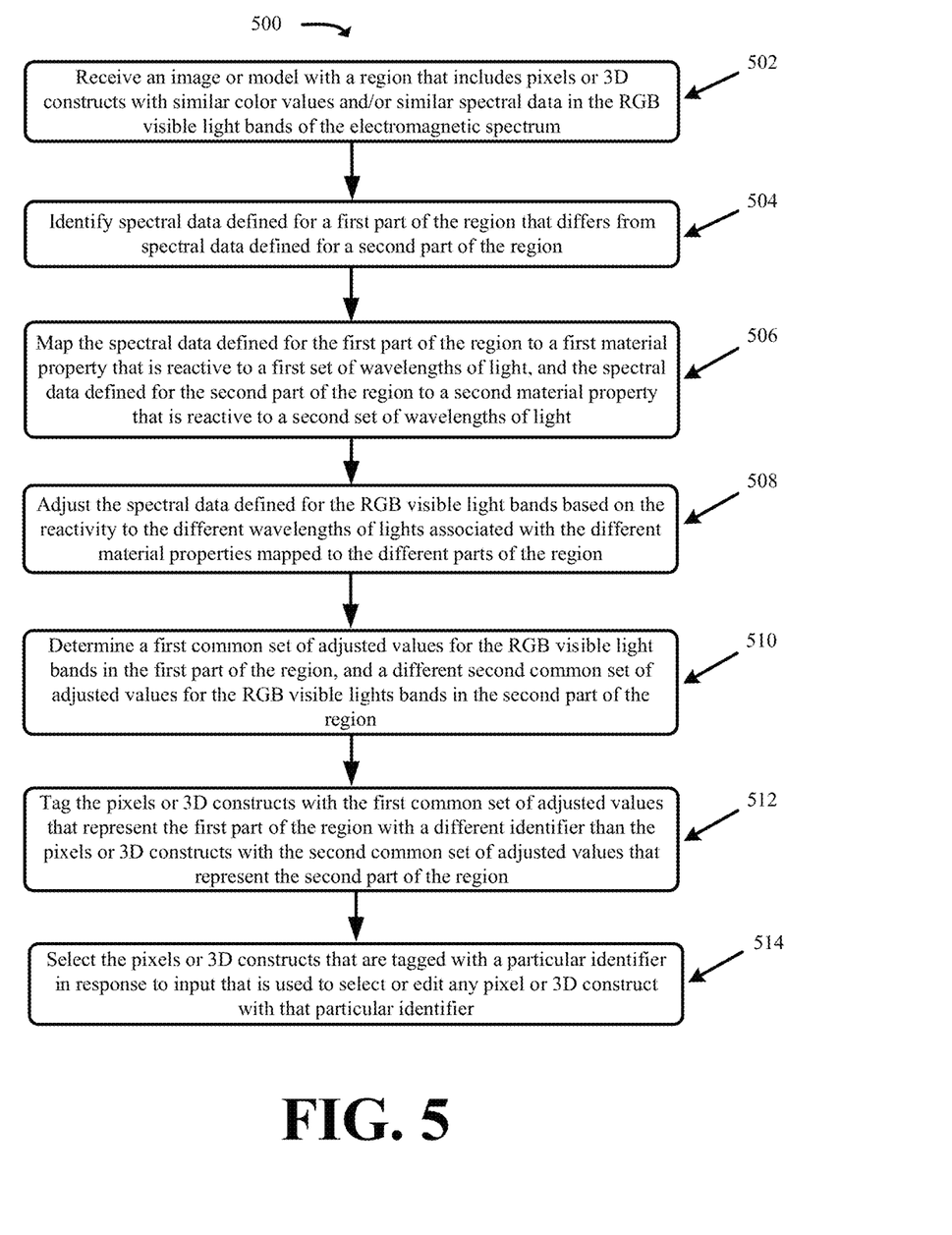
FIG. 5 presents a process for performing feature differentiation based on the removal of light effects in accordance with some embodiments presented herein.

FIG. 5 presents a process 500 for performing feature differentiation based on the removal of light effects in accordance with some embodiments presented herein. Process 500 is implemented by 3D modeling system 100.

Process 500 includes receiving (at 502) a 2D image or a 3D model with a region that includes pixels or 3D constructs with similar color values and/or similar spectral data in the RGB visible light bands of the electromagnetic spectrum. In some embodiments, the 2D image is the multi-spectral or multi-channel capture of a particular object. In some embodiments, the 3D model is generated from scanning or imaging a particular object under particular lighting conditions that are not accounted for or removed when generating the 3D model.

The 2D image or 3D model may be presented in a user interface. The user interface may provide various tools for interacting with or editing the represented particular object. The 2D image or 3D model may be rendered using the spectral data from the RGB visible light bands that is the same or similar across the region even though the spectral data for other bands may be different. Accordingly, a user cannot differentiate different features in the region based on the similar coloring or other visual characteristics encoded to the RGB visible light bands.

Process 500 includes identifying (at 504) spectral data defined for a first part of the region that differs from spectral data defined for a second part of the region. For instance, the RGB visible light band values may be the same or similar for the first and second parts of the region, but values for other bands (e.g., other visible light bands, infrared bands, ultraviolet bands, etc.) for the first and second parts of the region may differ.

Process 500 includes mapping (at 506) the spectral data defined for the first part of the region to a first material property that is reactive to a first set of wavelengths of light, and the spectral data defined for the second part of the region to a second material property that is reactive to a second set of wavelengths of light. 3D modeling system 100 may use different values that are measured for bands other than the RGB visible light bands to determine the different material properties for the pixels or 3D constructs representing the region.

Process 500 includes adjusting (at 508) the spectral data defined for the RGB visible light bands based on the reactivity to the different wavelengths of lights associated with the different material properties mapped to the different parts of the region. Specifically, 3D modeling system 100 identifies the reactivity associated with different surfaces of the object that are represented by the first and second sets of pixels or 3D constructs, and changes the values that were captured for the RGB visible light bands of those pixels or 3D constructs based on the identified reactivity and/or the wavelengths associated with the light illuminating those surfaces. In some embodiments, adjusting (at 508) the spectral data includes adjusting the rendered presentation of the region to change the coloring or visual characteristics according to the adjusted spectral data.

Process 500 includes determining (at 510) a first common set of adjusted values for the RGB visible light bands in the first part of the region, and a different second common set of adjusted values for the RGB visible lights bands in the second part of the region. Specifically, after adjusting the spectral data to account for and/or remove the effects of the light on the different material properties of the region, the first part of the region no longer has the same coloring or visualization as the second part of the region, and 3D modeling system 100 detects the different sets of pixels or 3D constructs that represent the first part of the region and the second part of the region as a result of the adjusted spectral data.

Process 500 includes tagging (at 512) the pixels or 3D constructs with the first common set of adjusted values and representing the first part of the region with a different identifier than the pixels or 3D constructs with the second common set of adjusted values representing the second part of the region. The identifiers differentiate the pixels or 3D constructs for the different features in the region that otherwise looks to be a single feature when viewed or captured under specific light.

Process 500 includes selecting (at 514) the pixels or 3D constructs that are tagged (at 512) with a particular identifier in response to input that is used to select or edit any pixel or 3D construct with that particular identifier. Accordingly, 3D modeling system 100 is able to accurately differentiate different features in a region or about an object that otherwise have similar colors or visual characteristics when viewed or captured under certain lighting conditions, and thereby improve user interactions with those features by automatically selecting or collectively editing the pixels or 3D constructs that represent the different features.

Figure 6:
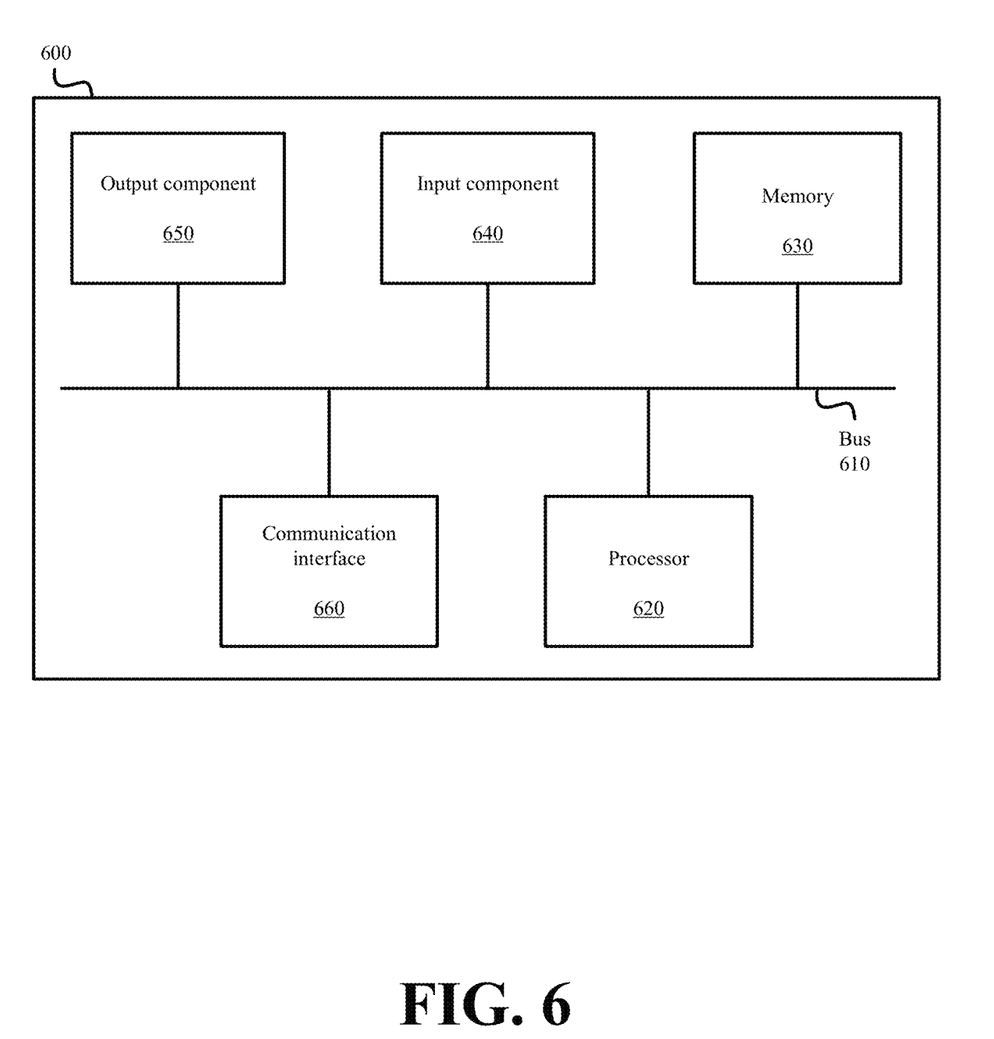
FIG. 6 illustrates example components of one or more devices, according to one or more embodiments described herein.

FIG. 6 is a diagram of example components of device 600. Device 600 may be used to implement one or more of the devices or systems described above (e.g., 3D modeling system 100). Device 600 may include bus 610, processor 620, memory 630, input component 640, output component 650, and communication interface 660. In another implementation, device 600 may include additional, fewer, different, or differently arranged components.

Bus 610 may include one or more communication paths that permit communication among the components of device 600. Processor 620 may include a processor, microprocessor, or processing logic that may interpret and execute instructions. Memory 630 may include any type of dynamic storage device that may store information and instructions for execution by processor 620, and/or any type of non-volatile storage device that may store information for use by processor 620.

Input component 640 may include a mechanism that permits an operator to input information to device 600, such as a keyboard, a keypad, a button, a switch, etc. Output component 650 may include a mechanism that outputs information to the operator, such as a display, a speaker, one or more LEDs, etc.

Communication interface 660 may include any transceiver-like mechanism that enables device 600 to communicate with other devices and/or systems. For example, communication interface 660 may include an Ethernet interface, an optical interface, a coaxial interface, or the like. Communication interface 660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 600 may include more than one communication interface 660. For instance, device 600 may include an optical interface and an Ethernet interface.

Device 600 may perform certain operations relating to one or more processes described above. Device 600 may perform these operations in response to processor 620 executing software instructions stored in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device. The software instructions stored in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
   receiving positional measurements for a plurality of points of a physical object;
   generating a 3D model of the physical object with a plurality of primitives that are defined in a 3D space based on the positional measurements;
   receiving an image of the physical object that captures different intensities with which the plurality of points reflect a plurality of electromagnetic spectrum bands;
   determining that the intensities with which a set of points from the plurality of points captured in the image reflect a set of the plurality of electromagnetic spectrum bands match a spectral signature of a particular material;
   determining that the particular material absorbs a first electromagnetic spectrum band and reflects a second electromagnetic spectrum band of the plurality of electromagnetic spectrum bands;
   adjusting colors that are represented for the set of points in the image by retaining effects that the intensities with which the set of points reflected the first electromagnetic spectrum band have on the colors and by removing effects that the intensities with which the set of points reflected the second electromagnetic spectrum band have on the colors; and
   defining the 3D model to differ from the captured image of the physical object by removing lighting effects on colors of the physical object captured by the image from the 3D model, wherein defining the 3D model comprises mapping adjusted colors that are represented for the set of points in the image to a set of the plurality of primitives that are defined in the 3D space based on the positional measurements received for the set of points.

2. The method of claim 1, wherein the plurality of electromagnetic spectrum bands comprises one or more electromagnetic spectrum bands in addition to electromagnetic spectrum bands for red, green, and blue visible light wavelengths.

3. The method of claim 1, wherein the intensities correspond to intensity values across different wavelengths of visible and non-visible light that are measured at the plurality of points of the physical object.

4. The method of claim 1, wherein determining that the intensities match the spectral signature comprises:
   determining that each point of the set of points absorbs a first subset of the set of electromagnetic spectrum bands in equivalent amounts as the particular material and that each point of the set of points reflects a second subset of the set of electromagnetic spectrum bands in equivalent amounts as the particular material.

5. The method of claim 1, wherein the spectral signature defines amounts by which the particular material absorbs and reflects different electromagnetic spectrum bands from the plurality of electromagnetic spectrum bands.

6. The method of claim 1, wherein adjusting the colors comprises:
   modifying the colors that are represented for the set of points in the image to account for different reactivity that the particular material has to the first electromagnetic spectrum band and the second electromagnetic spectrum band.

7. The method of claim 1 further comprising:
   determining that a light source illuminates the surface set of points of the physical object with wavelengths spanning at least the first electromagnetic spectrum band and the second electromagnetic spectrum band.

8. The method of claim 1 further comprising:
   determining that a second set of points from the plurality of points surface represents a second material based on the intensities with which the second set of points reflect a different second set of the plurality of electromagnetic spectrum bands matching a different spectral signature of the second material; and
   adjusting colors that are represented for the second set of points in the image differently than the colors that are represented for the set of points by retaining effects that the intensities with which the second set of points reflected the second electromagnetic spectrum band have on the colors of the second set of points and by removing effects that the intensities with which the second set of points reflected the first electromagnetic spectrum band have on the colors of the second set of points.

9. The method of claim 1 further comprising:
   determining different electromagnetic spectrum bands of the plurality of electromagnetic spectrum bands that each material of a plurality of different materials absorbs and reflects, wherein the plurality of different materials comprises the particular material.

10. The method of claim 1 further comprising:
    rendering a visualization of the 3D model with the colors adjusted to include the effects that the intensities in the first electromagnetic spectrum band have on the colors and to exclude the effects that the intensities in the second electromagnetic spectrum band have on the colors.

11. The method of claim 1, wherein the plurality of primitives comprises:
    one or more points, polygons, or meshes.

12. The method of claim 1 further comprising:
inserting an artificial light source in a 3D space of the 3D model; and
lighting the 3D model by adjusting colors of the plurality of primitives according to properties of the artificial light source, wherein lighting the 3D model comprises:
adjusting the colors of the set of primitives according to a reactivity of the particular material to the properties of the artificial light source.

13. The method of claim 1 further comprising:
determining that the set of points and a neighboring set of points are captured in the image with colors that are within a threshold range of each other; and
differentiating the set of points as a first feature of the physical object and the neighboring set of points as a different second feature of the physical object in response adjusting the colors that are represented for the set of points without adjusting the colors that are represented for the second set of points.

14. The method of claim 13 further comprising:
receiving a user selection of one or more primitives of the set of primitives; and
expanding the user selection to include all primitives of the set of primitives and no primitives representing the neighboring set of points in response to differentiating the set of points represented by the set of primitives in the 3D model as the first feature.

15. A system comprising:
one or more hardware processors configured to:
receive positional measurements for a plurality of points of a physical object;
generate a 3D model of the physical object with a plurality of primitives that are defined in a 3D space based on the positional measurements;
receive an image of the physical object that captures different intensities with which the plurality of points reflect a plurality of electromagnetic spectrum bands;
determine that the intensities with which a set of points from the plurality of points captured in the image reflect a set of the plurality of electromagnetic spectrum bands match a spectral signature of a particular material;
determine that the particular material absorbs a first electromagnetic spectrum band and reflects a second electromagnetic spectrum band of the plurality of electromagnetic spectrum bands;
adjust colors that are represented for the set of points in the image by retaining effects that the intensities with which the set of points reflected the first electromagnetic spectrum band have on the colors and by removing effects that the intensities with which the set of points reflected the second electromagnetic spectrum band have on the colors; and
define the 3D model to differ from the captured image of the physical object by removing lighting effects on colors of the physical object captured by the image from the 3D model, wherein defining the 3D model comprises mapping adjusted colors that are represented for the set of points in the image to a set of the plurality of primitives that are defined in the 3D space based on the positional measurements received for the set of points.

16. The system of claim 15, wherein the plurality of electromagnetic spectrum bands comprises one or more electromagnetic spectrum bands in addition to electromagnetic spectrum bands for red, green, and blue visible light wavelengths.

17. The system of claim 15, wherein determining that the intensities match the spectral signature comprises:
determining that each point of the set of points absorbs a first subset of the set of electromagnetic spectrum bands in equivalent amounts as the particular material and that each point of the set of points reflects a second subset of the set of electromagnetic spectrum bands in equivalent amounts as the particular material.

18. The system of claim 15, wherein adjusting the colors comprises:
modifying the colors that are represented for the set of points in the image to account for different reactivity that the particular material has to the first electromagnetic spectrum band and the second electromagnetic spectrum band.

19. The system of claim 15, wherein the one or more hardware processors are further configured to:
determine that a light source illuminates the set of points of the physical object with wavelengths spanning at least the first electromagnetic spectrum band and the second electromagnetic spectrum band.

20. A non-transitory computer-readable medium storing program instructions that, when executed by one or more hardware processors of a modeling system, cause the modeling system to perform operations comprising:
receiving positional measurements for a plurality of points of a physical object;
generating a 3D model of the physical object with a plurality of primitives that are defined in a 3D space based on the positional measurements;
receiving an image of the physical object that captures different intensities with which the plurality of points reflect a plurality of electromagnetic spectrum bands;
determining that the intensities with which a set of points from the plurality of points captured in the image reflect a set of the plurality of electromagnetic spectrum bands match a spectral signature of a particular material;
determining that the particular material absorbs a first electromagnetic spectrum band and reflects a second electromagnetic spectrum band of the plurality of electromagnetic spectrum bands;
adjusting colors that are represented for the set of points in the image by retaining effects that the intensities with which the set of points reflected the first electromagnetic spectrum band have on the colors and by removing effects that the intensities with which the set of points reflected the second electromagnetic spectrum band have on the colors; and
defining the 3D model to differ from the captured image of the physical object by removing lighting effects on colors of the physical object captured by the image from the 3D model, wherein defining the 3D model comprises mapping adjusted colors that are represented for the set of points in the image to a set of the plurality of primitives that are defined in the 3D space based on the positional measurements received for the set of points.

* * * * *